(12) United States Patent
Ghneim

(10) Patent No.: US 8,138,899 B2
(45) Date of Patent: Mar. 20, 2012

(54) REAR CAMERA BACKUP ASSISTANCE WITH TOUCHSCREEN DISPLAY USING TWO POINTS OF INTEREST

(75) Inventor: Maher M. Ghneim, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 12/495,978

(22) Filed: Jul. 1, 2009

(65) Prior Publication Data

US 2011/0001614 A1 Jan. 6, 2011

(51) Int. Cl.
*G08B 21/00* (2006.01)
(52) U.S. Cl. .................... 340/435; 340/436; 340/932.2; 348/148
(58) Field of Classification Search .................. 340/431, 340/435, 436, 932.2, 933; 280/477; 348/142, 348/148
See application file for complete search history.

(56) References Cited

U.S. PATENT DOCUMENTS

| | | | |
|---|---|---|---|
| 7,005,974 B2 | 2/2006 | McMahon et al. | |
| 7,309,075 B2 | 12/2007 | Ramsey et al. | |
| 7,511,607 B2 | 3/2009 | Hubbard et al. | |

OTHER PUBLICATIONS

Peak Performance Products, Back-Up Camera System with Color LCD Monitor, 2007.
Two Loons Trading Company, NightVision Hitch Up Quick Swift Hitch, Portable Wireless Full Color Back-up Camera System, 2007.

*Primary Examiner* — Jeffery Hofsass
(74) *Attorney, Agent, or Firm* — Frank MacKenzie, Esq.; MacMillan, Sobankski & Todd, LLC

(57) ABSTRACT

Assistance for a backup maneuver of a motor vehicle in which a first point of interest on the vehicle is moved toward a second point of interest remote from the vehicle. A rear contextual view is displayed on an electronic display obtained from a rearward directed image sensor on the vehicle. A zoom window is manually placed on the electronic display to include the second point of interest. The zoom window is enlarged, and the location of the second point of interest is manually identified within the enlarged zoom window. The identified location of the second point of interest is transformed into target positional coordinates. The rear contextual view redisplayed with a target icon at the target positional coordinates. The location of the first point of interest is manually identified on the rear contextual view and transformed into starting positional coordinates. A start icon is displayed at the starting positional coordinates in the rear contextual view. A target line is determined between the target positional coordinates and the starting positional coordinates. A path line icon is displayed in the rear contextual view corresponding to the determined target line. A bearing line is displayed in the rear contextual view extending from the start icon. The target positional coordinates are re-determined as the rear contextual view shifts during the backup maneuver. The target icon and the path line icon are updated in response to the re-determined target positional coordinates.

8 Claims, 3 Drawing Sheets

REAR CAMERA BACKUP ASSISTANCE WITH TOUCHSCREEN DISPLAY USING TWO POINTS OF INTEREST

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicular rearview camera systems, and, more specifically, to displaying backup maneuver steering directions on an electronic display.

Rear vision systems have become available for use on motor vehicles to monitor the area behind the vehicle by providing a camera image on a display panel visible to the driver. Such systems increase visibility for the driver of any obstacles that may be present while backing up. Some rear vision systems have been specifically intended to assist in the connecting of a trailer hitch to a trailer. By allowing the driver to see the trailer hitch and the trailer together in the field of view of a rear camera, the driver is better able to back up the vehicle so that the trailer hitch is accurately placed at the hitch-receiver on the trailer. However, since the actual backup path has to be controlled by the driver in a way that feels unnatural for most drivers, it remains difficult for some to steer the vehicle so that the trailer hitch moves in the desired manner on the backup display.

SUMMARY OF THE INVENTION

The present invention provides assistance for backup maneuvers beyond just showing the hitch and trailer on the rear image. Guidance icons are provided on the rearview display based on simple user inputs without requiring additional external sensors.

In one aspect of the invention, a method is provided for assisting a backup maneuver of a motor vehicle in which a first point of interest on the vehicle is moved toward a second point of interest remote from the vehicle. A rear contextual view is displayed on an electronic display visible to a driver of the vehicle, wherein the rear contextual view is obtained from a rearward directed image sensor on the vehicle, and wherein the rear contextual view includes the first point of interest and the second point of interest. The placement of a zoom window is manually configured on the electronic display to include the second point of interest. The portion of the rear camera view contained in the zoom window is enlarged on the electronic display. The location of the second point of interest is manually identified within the enlarged zoom window. The identified location of the second point of interest is transformed into target positional coordinates within the rear contextual view. The rear contextual view redisplayed. A target icon is displayed at the target positional coordinates in the rear contextual view. The location of the first point of interest is manually identified on the rear contextual view. The identified location of the first point of interest is transformed into starting positional coordinates within the rear contextual view. A start icon is displayed at the starting positional coordinates in the rear contextual view. A target line is determined between the target positional coordinates and the starting positional coordinates. A path line icon is displayed in the rear contextual view corresponding to the determined target line. A bearing line is displayed in the rear contextual view extending from the start icon in a direction parallel with the axis of the vehicle projected into the rear contextual view. The target positional coordinates are re-determined as the rear contextual view shifts during the backup maneuver. The target icon and the path line icon are updated in response to the re-determined target positional coordinates.

DETAILED DESCRIPTION OF PREFERRED EMBODIMENTS

Figure 1:
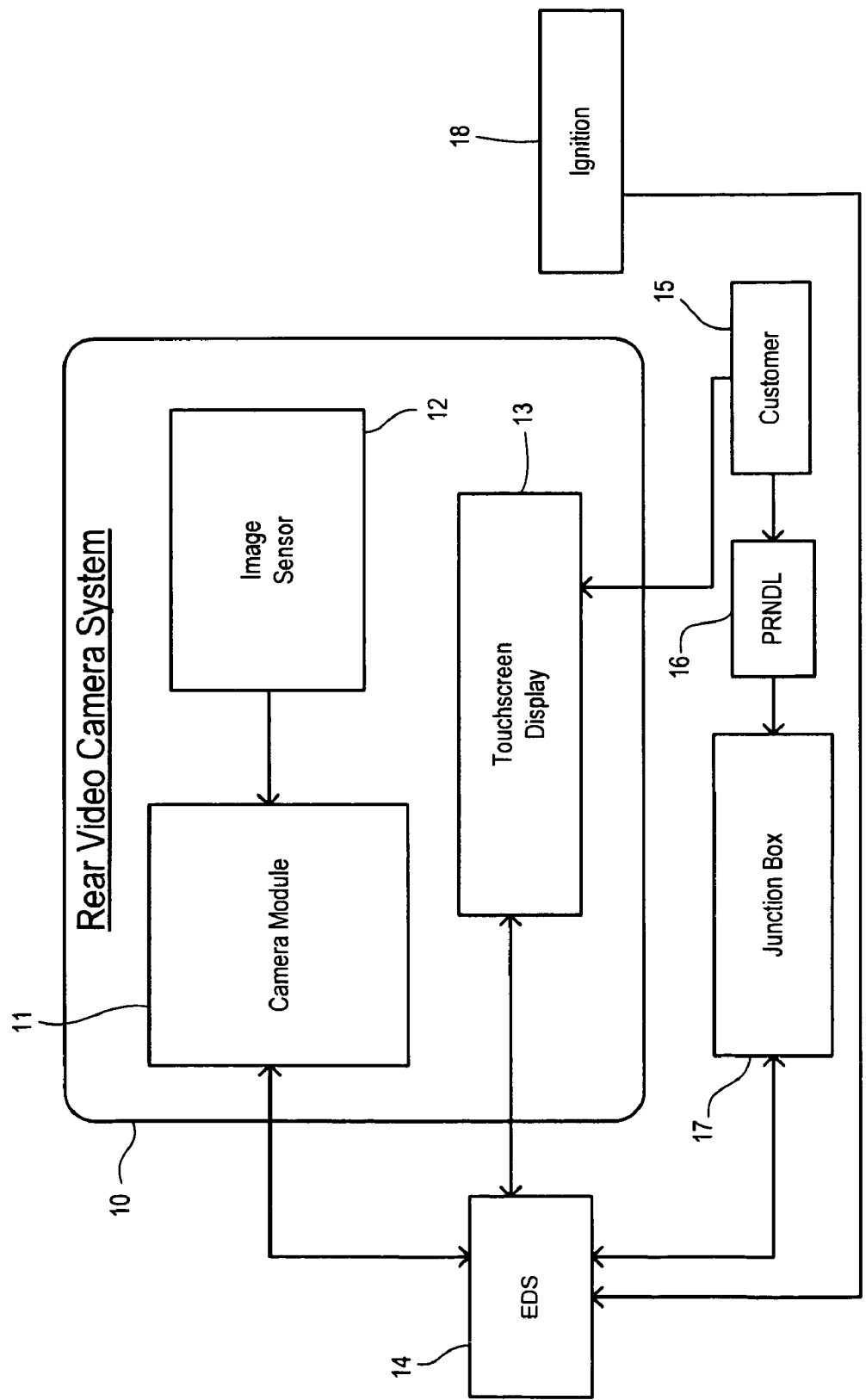
FIG. 1 is a block diagram showing a preferred embodiment of the invention.

Referring to FIG. 1, backup assist apparatus is shown for installation in a motor vehicle. A rear video camera system 10 includes a camera module 11, image sensor 12, and touchscreen display 13. Image sensor 12 is deployed on the vehicle with a view to the rear of a vehicle (not shown) and may be comprised of a CCD or CMOS imager providing a conventional video signal to camera module 11. Camera module 11 may be coupled to touchscreen display 13 via an electrical distribution system (EDS) 14 such as a wiring harness. Alternatively, camera module 11 and touchscreen display 13 can be directly connected or integrated into a single unit. Image sensor 12 is shown with a direct connection to camera module 11. Image sensor 12 can be included as part of module 11 in one box or may be separate from module 11 and can be connected via EDS 14. Using the image data provided by image sensor 12, camera module 11 generates various camera views together with overlays as described below that are transmitted to touchscreen display 13 for generating a visible image for the driver of the vehicle.

A customer 15 (e.g., the driver or a vehicle passenger) interacts with touchscreen display 13 by tapping the screen on desired regions of a displayed video scene or on various icons generated on the display. Customer 15 also controls the setting of a transmission gear lever 16 which generates a corresponding electrical signal identifying a gear selection (i.e., conventional PRNDL gear settings). The gear setting signal is provided through a smart junction box 17 and through EDS 14 to camera module 10 so that camera module 10 can detect when the gear being selected is the reverse gear. A "run" signal from an ignition switch 18 under control of customer 15 using their vehicle key is coupled through EDS 14 to camera module 11 in the same manner.

According to a preferred embodiment of the invention of FIG. 1, when ignition switch 18 is on and when transmission selector 16 is in reverse gear, the rear video camera system operates in a backup assist mode for helping the driver to backup to a designated target position. FIGS. 2-6 show contents of the electronic display screen during operation of a preferred embodiment of the invention. In addition to the camera scene and the icons overlaid on the camera image, textual instructions or prompts (not shown) may also be provided on the screen or on a separate display associated with the vehicle (e.g., a driver information display or a cluster display).

Figure 2:
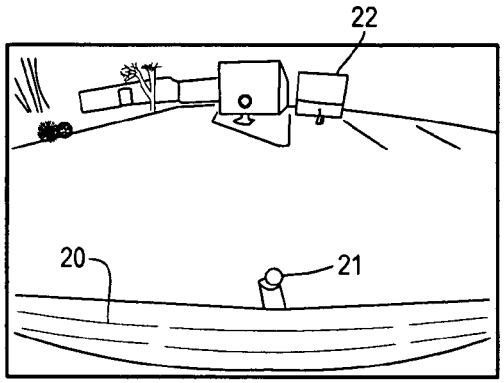
FIGS. 2-6 are screen shots showing the contents of a rear camera display during a backup maneuver according to one embodiment of the invention.

FIG. 2 shows an initial "rear contextual view" that preferably is comprised of a full screen image from the image sensor. This view preferably shows a portion of the rear of the vehicle (e.g., bumper) and the surrounding area into which the backup maneuver will be performed. Thus, the vehicle includes a rear bumper 20 and a trailer hitch 21. A trailer 22 is present within the scene. In the present example, the driver desires to attach hitch 21 to a hitch-receiver on trailer 22. In order to generate overlays to assist the driver in performing a backup maneuver, the present invention allows the driver to accurately identify points of interest on the touchscreen so that the camera module can calculate an appropriate guidance line for display as an overlay.

Figure 3:
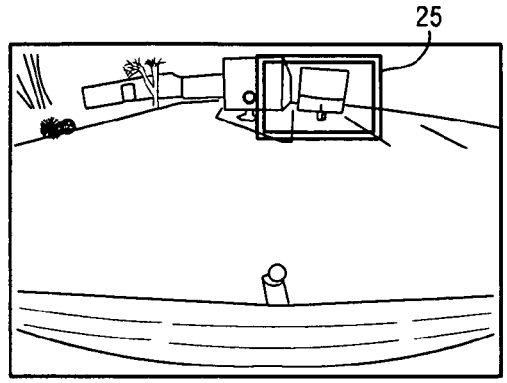

As described herein, a first point of interest is the point on the vehicle that is to be moved toward a second point of interest. In the present example, the first point of interest is hitch 21 and the second point of interest is a receiver for hitch 21 on trailer 22. Since the second point of interest may be a significant distance away from the vehicle resulting in low resolution for visualization and identification of the desired point, a zoom window 25 is defined on the rear contextual view for enlarging a portion of the image so that the driver can accurately identify the location of the second point of interest. Thus, the driver manually configures placement of zoom window 25 as shown in FIG. 3 by manipulating the touchscreen display so that zoom window 25 is placed over the second point of interest (e.g., trailer 22). Placement of the zoom window may be performed by tapping opposite corners of the desired zoom window, tapping a first corner and then dragging the finger diagonally to define the zoom window, or using other techniques including those not requiring a touchscreen (such as using a mouse or track ball).

Figure 4:
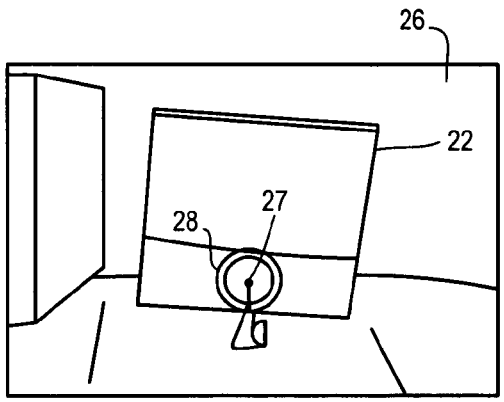

After defining zoom window 25, the electronic display enlarges the area in the zoom window as shown in FIG. 4, thereby providing a magnified image so that the second point of interest can be more accurately located. Thus, magnified image 26 shows trailer 22 and its hitch receiver 27 at a larger scale. By manually tapping the touchscreen, a target icon 28 is generated to define the location of hitch receiver 27 on the magnified zoom image.

Figure 5:
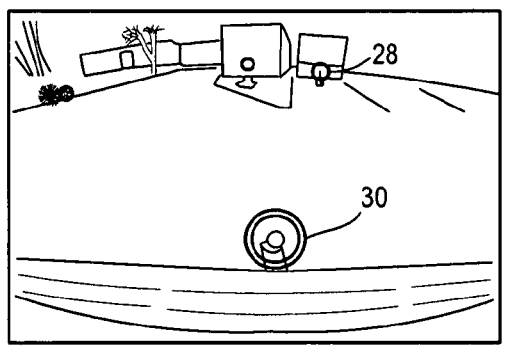

After defining the location of the second point of interest, the touchscreen display reverts to the rear contextual view (i.e., no longer zoomed) as shown in FIG. 5 so that the driver can manually identify the location of the first point of interest (e.g., the trailer hitch). After tapping the touchscreen display at the location of the first point of interest, a start icon 30 is overlaid on the camera image to confirm the start location. It will be readily apparent to those skilled in the art that the order of identifying the points of interest could be reversed and that controls for revising or removing a point of interest can be provided.

Figure 6:
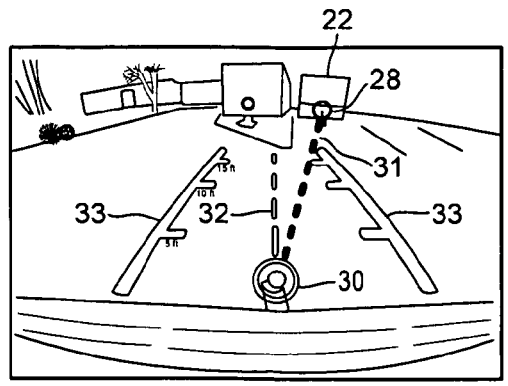

The positional coordinates of the identified locations for the first and second points of interest can be used by the camera module in order to calculate a target line between the first and second points of interest. As shown in FIG. 6, the calculated target line is displayed as a path line on the rear contextual view between the start icon 30 and target icon 28. Path line 31 may preferably be comprised of an icon including a dashed line of a particular color, for example.

FIG. 6 additionally shows a bearing line 32 that is drawn on the touchscreen display by the camera module such that the bearing line extends from the start icon in a direction parallel with the axis of the vehicle as projected into the rear contextual view. In other words, bearing line 32 indicates the backup direction of the vehicle within the rear contextual view. By turning the vehicle in order to align bearing line 32 with path line 31, the vehicle will be guided to the hitch receiver of trailer 22. Bearing line icon 32 may further include distance and vehicle side markers 33 to improve the driver's perception for the vehicle maneuver.

As the vehicle moves, the image of trailer 22 and hitch receiver 27 shift within the rear contextual view. In order to continue to provide accurate guidance, the positional coordinates of the target within the rear contextual view must be continually re-determined. As the target positional coordinates change, the target icon and the path line icon are updated on the display in response to the re-determined target positional coordinates. Tracking of the shifting positional coordinates within the image may be performed by the camera module using commercially available pattern recognition software such as that used in conventional object detection systems and vehicular lane tracking systems, for example. Since the trailer hitch 21 and start icon 30 are fixed with respect to the image sensor, they are fixed within the image. As the detected positional coordinates for hitch receiver 27 and target icon 28 move within the image, the camera module redraws the path line icon according to the re-determined target positional coordinates. Once target icon 28 has shifted to a point directly behind the hitch, path line 31 and bearing line 32 will coincide. As trailer hitch 21 approaches receiver 27, the length of path line 31 decreases and the driver can easily determine any necessary turning and stopping to bring the hitch into the position of the receiver.

Figure 7:
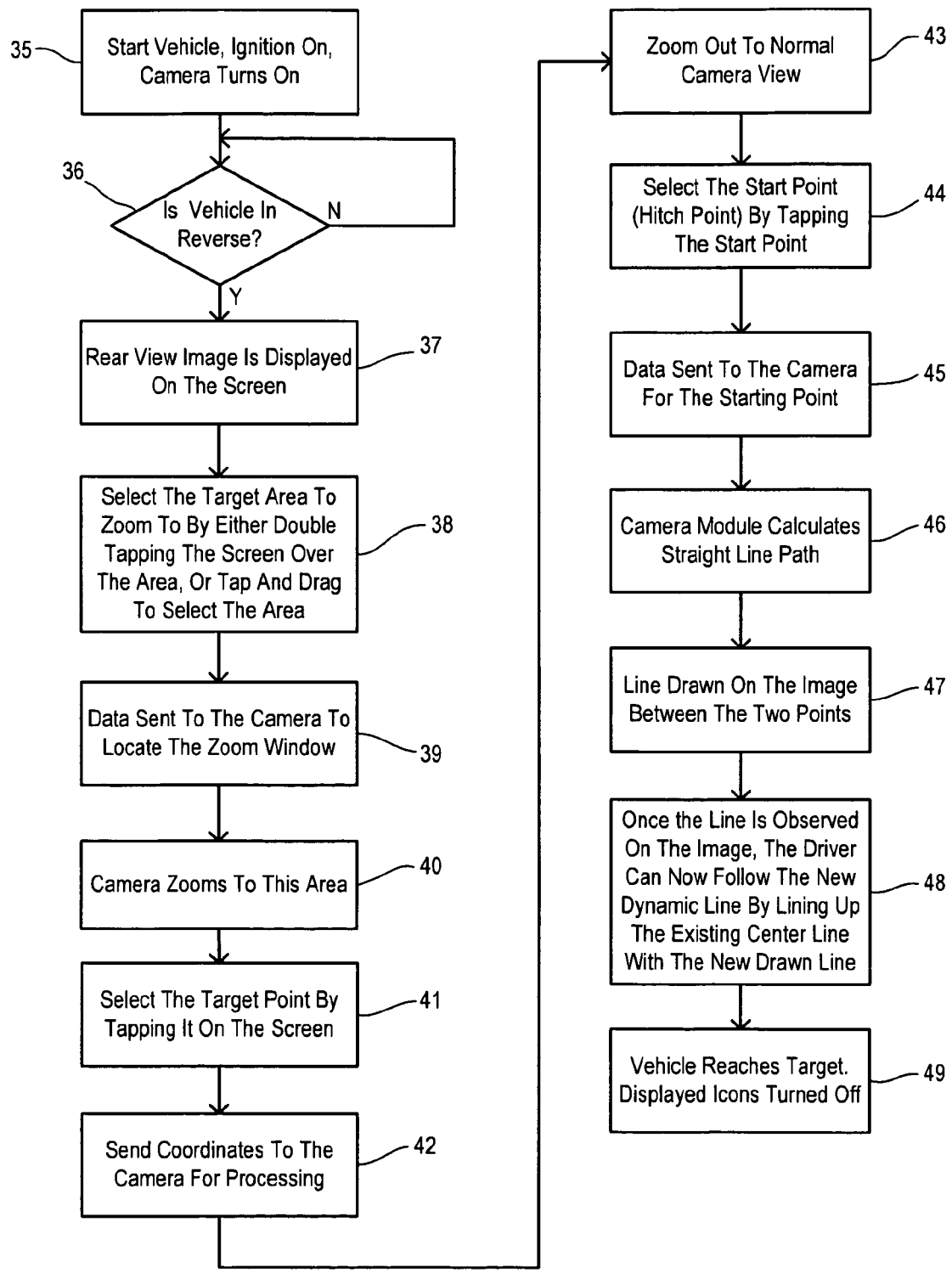
FIG. 7 is a flowchart showing one preferred method of the invention.

A preferred method of the invention is summarized in FIG. 7. In step 35, the vehicle is started, the ignition "run" signal turns on, and the rear vision camera turns on. In step 36, a check is made to determine whether the vehicle has been placed into reverse gear. If not, then the gear selection is rechecked until the reverse gear is detected. Once the gear lever is placed in reverse gear, the rear contextual view is displayed on the display screen and the backup assist process is begun in step 37. In step 38, the driver or other user selects a target area or zoom window containing the target point of interest by either double tapping the screen at diagonal corners of the desired area or by tapping an initial corner or edge and dragging to define another corner or edge of the zoom window. Based on the user actions, touchscreen data defining the selected region within the image is used by the camera module to overlay the display image with an icon showing the zoom window. In step 40, the camera module zooms (i.e., magnifies) the displayed image to show only the data within the selected region. While the zoom window is displayed, the driver selects the target point (i.e., second point of interest) by tapping on the touchscreen at the appropriate spot in the image in step 41. The newly selected coordinates within the zoom window are sent to the camera module for processing in step 42. The processing may preferably include performing a transformation of the coordinates within the zoom window into the corresponding coordinates of the spot in the rear contextual view. As a result of using a magnified image for selecting the remote point of interest, a much more accurate determination of the positional coordinates for the target is obtained.

In step 43, the camera module restores the displayed image back out to its normal rear contextual view. On the rear contextual view, the start point (such as the trailer hitch) is selected by tapping at the start point of the desired path line in step 44. In step 45, the positional coordinate data is sent to the camera module for the starting point. Based on the positional coordinates of the two points, the camera module calculates a straight line path in step 46. In step 47, the path line is drawn on the display image between the two points.

As shown in step 48, once the path line is observed on the display image, the driver can follow the desired path dynamically by lining up the bearing line with the dynamically updated path line. In step 49, the vehicle reaches the target point and the displayed icons are all turned off.

What is claimed is:

1. A method for assisting a backup maneuver of a motor vehicle in which a first point of interest on the vehicle is moved toward a second point of interest remote from the vehicle, the method comprising the steps of:
    displaying a rear contextual view on an electronic display visible to a driver of the vehicle, wherein the rear contextual view is obtained from a rearward directed image sensor on the vehicle, and wherein the rear contextual view includes the first point of interest and the second point of interest;
    manually configuring the placement of a zoom window on the electronic display to include the second point of interest;
    enlarging on the electronic display the portion of the rear camera view contained in the zoom window;
    manually identifying the location of the second point of interest within the enlarged zoom window;
    transforming the identified location of the second point of interest into target positional coordinates within the rear contextual view;
    redisplaying the rear contextual view;
    displaying a target icon at the target positional coordinates in the rear contextual view;
    manually identifying on the rear contextual view the location of the first point of interest;
    transforming the identified location of the first point of interest into starting positional coordinates within the rear contextual view;
    displaying a start icon at the starting positional coordinates in the rear contextual view;
    determining a target line between the target positional coordinates and the starting positional coordinates;
    displaying a path line icon in the rear contextual view corresponding to the determined target line;
    displaying a bearing line in the rear contextual view extending from the start icon in a direction parallel with the axis of the vehicle projected into the rear contextual view;
    re-determining the target positional coordinates as the rear contextual view shifts during the backup maneuver; and
    updating the target icon and the path line icon in response to the re-determined target positional coordinates.

2. The method of claim 1 wherein the electronic display is comprised of a touchscreen display, and wherein the steps of manually configuring placement of the zoom window, manually identifying the location of the second point of interest, and manually identifying the location of the first point of interest each include the action of manually tapping a corresponding position on the touchscreen display.

3. The method of claim 2 wherein the step of manually configuring placement of the zoom window further includes the action of dragging on the touchscreen display.

4. The method of claim 1 wherein the bearing line is displayed as an icon that includes distance markers.

5. A backup assist apparatus for a motor vehicle to assist a backup maneuver wherein a first point of interest on the vehicle is moved toward a second point of interest remote from the vehicle, comprising:
    an image sensor for detecting a rearward directed image from the vehicle;
    an electronic display visible to a driver of the vehicle; and
    a camera module coupled to the electronic display and the image sensor generating a rear contextual view on the electronic display in response to the rearward directed image, wherein the camera module is responsive to manual user input to configure the placement of a zoom window on the electronic display that includes the second point of interest, wherein the camera module enlarges on the electronic display the portion of the rear camera view contained in the zoom window, wherein the camera module is responsive to manual input to identify the location of the second point of interest within the enlarged zoom window, wherein the camera module transforms the identified location of the second point of interest into target positional coordinates within the rear contextual view, wherein the camera module redisplays the rear contextual view, wherein the camera module displays a target icon at the target positional coordinates in the rear contextual view, wherein the camera module is responsive to manual input to identify on the rear contextual view the location of the first point of interest, wherein the camera module transforms the identified location of the first point of interest into starting positional coordinates within the rear contextual view, wherein the camera module displays a start icon at the starting positional coordinates in the rear contextual view, wherein the camera module determines a target line between the target positional coordinates and the starting positional coordinates, wherein the camera module displays a path line icon in the rear contextual view corresponding to the determined target line, wherein the camera module displays a bearing line in the rear contextual view extending from the start icon in a direction parallel with the axis of the vehicle projected into the rear contextual view, wherein the camera module re-determines the target positional coordinates as the rear contextual view shifts during the backup maneuver, and wherein the camera module updates the target icon and the path line icon in response to the re-determined target positional coordinates.

6. The apparatus of claim 5 wherein the electronic display is comprised of a touchscreen display, and wherein the manual placement of the zoom window, the manual identification of the location of the second point of interest, and the manual identification of the location of the first point of interest each include manually tapping a corresponding position on the touchscreen display.

7. The apparatus of claim 6 wherein the manual placement of the zoom window further includes dragging on the touchscreen display.

8. The apparatus of claim 5 wherein the bearing line is displayed as an icon that includes distance markers.

* * * * *